United States Patent
Zitha

(10) Patent No.: US 7,032,670 B2
(45) Date of Patent: Apr. 25, 2006

(54) METHOD TO FORM A BARRIER IN RESERVOIR WITH A MAGNETORHEOLOGICAL FLUID

(75) Inventor: Pacelli Lidio Jose Zitha, Delft (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 10/962,355

(22) Filed: Oct. 8, 2004

(65) Prior Publication Data

US 2005/0109512 A1    May 26, 2005

Related U.S. Application Data

(63) Continuation of application No. PCT/NL03/00275, filed on Apr. 10, 2003.

(30) Foreign Application Priority Data

Apr. 10, 2002   (NL) .................................... 1020354

(51) Int. Cl.
*E21B 43/16* (2006.01)
(52) U.S. Cl. ................... 166/305.1; 166/66.5; 166/292; 166/369
(58) Field of Classification Search ............... 166/66.5, 166/248, 305.1, 369, 292
See application file for complete search history.

(56) References Cited

U.S. PATENT DOCUMENTS

| 3,749,174 | A | * | 7/1973 | Friedman et al. ............ 166/294 |
| 4,579,173 | A | | 4/1986 | Rosensweig et al. |
| 5,238,067 | A | | 8/1993 | Jennings, Jr. |
| 6,250,848 | B1 | | 6/2001 | Moridis et al. |
| 6,527,972 | B1 | * | 3/2003 | Fuchs et al. ............. 252/62.54 |
| 6,619,388 | B1 | * | 9/2003 | Dietz et al. ................ 166/66.7 |
| 6,719,055 | B1 | * | 4/2004 | Mese et al. .............. 166/308.1 |

OTHER PUBLICATIONS

Bailey, Bill, et al., "Water Control", *Oilfield Review*, (Spring 2000),30-51.
Zitha, P. L., et al., "Fluid Flow Control Using Magnetorheological Fluids", *Society of Petroleum Engineers #75144,* (Apr. 13, 2002), 10 pp.

* cited by examiner

*Primary Examiner*—David Bagnell
*Assistant Examiner*—Giovanna M. Collins
(74) *Attorney, Agent, or Firm*—Jeffrey D. Myers; Peacock Myers, PCC

(57) ABSTRACT

A method of winning oil from a source via a bored well, wherein a magnetorheological fluid is introduced into the source via the bored well to reduce the water content of the oil won. Oil drilling is resumed in the presence of a magnetic field, thereby increasing the oil yield and/or decreasing the water content of the drilled oil.

7 Claims, No Drawings

METHOD TO FORM A BARRIER IN RESERVOIR WITH A MAGNETORHEOLOGICAL FLUID

The present invention relates to a method of winning oil from a source via a bored well, wherein a sealing fluid is introduced into the source via the bored well to reduce the water content of the oil won.

Such a method is described by Bailey, W. et al. (Oilfield Review, Spring, pp. 30–51 (2000)). In this paper water-soluble polymers are introduced into the well, which gel in situ. This technique is used to limit the amount of water being brought up together with the oil, because when drilling both at sea and on land, there is often much water borne along with the oil. This water must be separated, which not only involves extra costs, but it must moreover be purified in a responsible manner before it may be discharged. A further problem existing when drilling for oil is the formation of water fingers, causing the yield of the source to drop to none-economical values, while in terms of absolute quantities there is still an interesting amount of oil present in the source. Part of this problem is caused by the fact that water is much less viscous than the oil to be won. Right from the onset, or in the course of time, one or several water layers will be present, which water is brought up relatively easily, to the detriment of the oil yield. By introducing a gel-forming polymer solution, the water-bearing strata are blocked. This approach increase the oil yield and/or decreases the water content of the drilled oil.

The object of the invention is to provide a further developed method with which a greater degree of control is possible.

To this end the method according to the present invention is characterised in that the sealing fluid is a magnetorheological liquid, which is introduced into porous strata, after said introduction a magnetic field is applied to increase the viscosity of the magnetorheological fluid or even solidifying the same, with the result that the porous strata are obstructed to various degrees, and subsequent to which the obstruction of at least one oil-bearing porous stratum is broken through.

In contrast with gel formation, the viscosity of a magnetorheological fluid can be regulated accurately and is reversible. According to the invention, the magnetorheological fluid penetrates porous strata. These may be both oil-bearing or water-bearing strata. The lower flow resistance in water-bearing strata enables the magnetorheological fluid to penetrate deeper into these. Then the magnetic field is activated, preferably by means of an electromagnet. At the level of an oil-bearing stratum a relatively thin and weak obstruction is formed, and at the level of a water-bearing stratum a relatively thick and strong obstruction is formed. The weak obstruction is now broken through, while the strong obstruction remains intact. This may occur due to the resumption of drilling, which causes a force to be exerted on the more viscous or even solidified magnetorheological fluid. In other words, the breakthrough of the obstruction is implemented by the application of different pressures at the two sides of the obstruction. To realise this, the hydrostatic pressure in the bored well may be reduced (pumping liquid in the bored well up and/or out). Alternatively, if an injector well is present, the pressure on the injector well may be increased. Because the obstruction in an oil-bearing stratum is less thick, it is the weakest and will break through, while the one for the water-bearing stratum remains intact. If no breakthrough occurs, the intensity of the magnetic field is reduced, causing the strength of the obstruction to be reduced until the oil breaks through the obstruction in the oil-bearing stratum. An important aspect is that the magnetorheological fluid does not need to be introduced at an accurately determined location, i.e. it is not necessary to know the exact location of the water-bearing stratum or an oil-bearing stratum. The magnetic component may be any magnetic component such as a paramagnetic component, and preferably a ferromagnetic component. It will be clear to the person skilled in the art that the amount of magnetic component can be varied within a wide range, depending on the requirements with respect to malleability during setting. At least 80% of the particles of the particulate component has a size between 0.00005 to 5 mm, preferably between 0.0005 and 0.5 mm. It is essential for the particles to sufficiently interact (cohesion/adhesion) with the surrounding setting fluid to be able to affect the flow behaviour. The viscosity should be increased at least 2-fold and preferably at least 10-fold at the chosen field intensity. Optionally, the particles may be provided with a coating or may be incorporated in a larger object such as a sphere. Should the occasion arise, a coating can also protect the particles against oxidation. In this way even a limited amount of the magnetic component itself can have a strong effect on the drilling fluid, which may be favourable in respect of costs. During setting, the magnetic field provided will usually have an intensity of at least 0.01 Tesla, and preferably at least 0.05, such as 0.05 to 0.5 Tesla. In addition to the known magnetorheological fluids there are also ferrofluids. In a ferrofluid each magnetic particle (of, for example, 15 nm) is an individual domain. Ferrofluids can not be used in the present invention because the provision of a magnetic field does not or only slightly increase the viscosity. It should be noted that when such individual domain particles are clustered to larger particles, for example, by incorporation in colloidal silica, particles are formed comprising more domains, and are thus able to impart magnetorheological properties to the fluid. These are useful for the invention. As material for the preparation of the magnetorheological drilling fluid it is preferred to use ground magnetite, which is very cheap.

U.S. Pat. No. 4,579,173 relates to promoting the winning of oil with the aid of a ferrofluid.

U.S. Pat. No. 6,250,848 describes the use of ferrofluids for various applications, among which sealing a tank using a mixture of ferrofluid and colloidal silica.

Neither of the above-mentioned publications describes the use of a magnetorheological fluid and the breakthrough of an obstruction applied in an oil-bearing strata.

Folkert Wessel's thesis describes on page 36 several applications of magnetorheological fluids for obstructing strata. There is no mention or suggestion of breaking through a provided obstruction.

As the magnetorheological fluid it is preferred to introduce an aqueous magnetorheological fluid.

This has a greater tendency to penetrate the water-bearing stratum.

The magnetorheological fluid preferably further comprises a setting component, which sets in the presence of the applied magnetic field and after winning some oil.

Then, at a particular moment, the electromagnetic field can be deactivated, and the electromagnet optionally removed from the borehole. The setting component may set more slowly than traditional setting components, as the same may not yet have set when oil extraction is resumed (breakthrough of obstruction of the oil-bearing stratum). The person skilled in the art will be quite capable of choosing a suitable duration.

The setting component preferably comprises a cross-linkable polymer, which in the presence of the applied magnetic field undergoes a cross-linking reaction causing the magnetorheological fluid to set.

Thus in a simple manner it is guaranteed that the water-bearing stratum is permanently sealed.

The magnetorheological fluid preferably comprises 5–50 vol. / vol. % magnetic or magnetisable particles.

It is possible to opt for a lower content, which is economically attractive, if the application of a relatively stronger electromagnetic field poses no real problems and vice versa.

The magnetic or magnetisable particles are preferably strongly magnetic or magnetisable. This limits the required intensity of the electromagnetic field. The magnetic or magnetisable particles are therefore preferably chosen from magnetite, iron/cobalt and vanadium alloys.

According to an interesting application, acid is introduced after the application of the magnetic field, to increase the porosity of the oil-bearing stratum.

Acid can be introduced in two ways. First, the acid may be introduced at a pressure such that the obstruction of the oil-bearing stratum is broken through and the acid finds its way into the oil-bearing stratum where it increases the porosity of the oil-bearing stratum. Second, the obstruction of the oil-bearing stratum can first be broken by drilling (again keeping the obstruction of the water-bearing stratum intact), after which the acid is introduced in a simple manner. Especially for the first option it may be preferable to introduce the acid contained in oil.

What is claimed is:

1. A method of winning oil from a source via a bored well comprising the steps of:

disposing a sealing fluid comprising a magnetorheological liquid, into one or more porous strata;

providing a magnetic field to increase the viscosity of said magnetorheological fluid, such that the porous strata is at least partially obstructed; and breaking at least a portion of at least one of the oil-bearing porous stratum.

2. The method according to claim 1, wherein the step of diposing a sealing fluid comprises introducing magnetorheological fluid as an aqueous magnetorheological fluid.

3. The method according to claim 1, wherein the step of diposing a sealing fluid comprises disposing a sealing fluid comprising magnetorheological fluid that further comprises a setting component which sets in the presence of the applied magnetic field.

4. The method according to claim 3, wherein the step of disposing a sealing fluid comprises disposing a sealing fluid comprising magnetorheological fluid which further comprises a setting component, wherein said setting component comprises a cross-linkable polymer, which in the presence of the applied magnetic field undergoes a cross-linking reaction causing the magnetorheological fluid to set.

5. The method according to claim 1, wherein the magnetorheological fluid comprises 5–50% by volume of magnetic or magnetisable particles.

6. The method according to claim 5, wherein the magnetic or magnetisable particles are chosen from the group consisting of magnetite, iron/cobalt and vanadium alloys, and combinations thereof.

7. The method according to claim 1, further comprising the step of introducing an acid after the application of the magnetic field to increase the porosity of the oil-bearing statum.

* * * * *